United States Patent
Kobayashi et al.

(10) Patent No.: US 7,033,966 B2
(45) Date of Patent: Apr. 25, 2006

(54) OPTICAL GLASS AND LENS

(75) Inventors: Tomoyuki Kobayashi, Kanagawa (JP); Minoru Sekine, Kanagawa (JP); Naoki Sugimoto, Kanagawa (JP); Syuji Matsumoto, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/848,077

(22) Filed: May 19, 2004

(65) Prior Publication Data

US 2004/0235634 A1    Nov. 25, 2004

(30) Foreign Application Priority Data

May 21, 2003    (JP) .............................. 2003-143617

(51) Int. Cl.
*C03C 3/12* (2006.01)
*C03C 3/14* (2006.01)

(52) U.S. Cl. ............................ 501/41; 501/42; 501/45; 501/46; 501/47; 501/48; 501/49; 501/50; 501/51; 501/52

(58) Field of Classification Search ................ 501/41, 501/42, 45–52, 901
See application file for complete search history.

(56) References Cited

U.S. PATENT DOCUMENTS

| | | | | |
|---|---|---|---|---|
| 4,732,875 | A | * | 3/1988 | Sagara .......................... 501/42 |
| 5,283,212 | A | * | 2/1994 | Aitken et al. .................. 501/73 |
| 2003/0045421 | A1 | * | 3/2003 | Burger et al. .................. 501/41 |
| 2004/0109225 | A1 | * | 6/2004 | Hu et al. ................... 359/341.1 |

FOREIGN PATENT DOCUMENTS

| | | |
|---|---|---|
| JP | 61-197443 | 9/1986 |
| JP | 62-3042 | 1/1987 |
| JP | 62-119138 | 3/1987 |
| JP | 62-128946 | 6/1987 |
| JP | 2001-180971 | 7/2001 |
| JP | 2004-43294 | 2/2004 |

OTHER PUBLICATIONS

Feng et al., "Hydroxyl groups in erbium doped germano-tellurite glasses," Journal of Non-Crystalline Solids, 281 (2001) 48-54.*

* cited by examiner

*Primary Examiner*—David Sample
(74) *Attorney, Agent, or Firm*—Oblon, Spivak, McClelland, Maier & Neustadt, P.C.

(57) ABSTRACT

An optical glass which contains at least 20 mol % of $TeO_2$ and has an internal transmittance of at least 80% in a thickness of 2 mm to a light having a wavelength of 405 nm and a refractive index of at least 1.85 to the same light, and which contains no alkali metal oxide or contains alkali metal oxides in a total amount of at most 15 mol %.

10 Claims, No Drawings

OPTICAL GLASS AND LENS

BACKGROUND OF THE INVENTION

1. Field of the Invention

The present invention relates to an optical glass and a lens suitable for e.g. an object lens to be used for recording on or reading out from an optical recording medium such as CD, CD-R, CD-RW, DVD or MO.

2. Discussion of Background

Recording on an optical recording medium such as CD is carried out by condensing a laser beam by an object lens. It is common to employ a laser beam having a wavelength of 780 nm and an object lens having a numerical aperture of from 0.4 to 0.45. In a case where a higher recording density is desired, it is common to employ a laser beam having a wavelength of 650 nm and an object lens having a numerical aperture of 0.65.

In recent years, in order to further increase the recording density, it has been proposed to use a laser beam having a wavelength of from 400 to 415 nm, e.g. 405 nm and an object lens having a numerical aperture of from about 0.65 to 0.85. In order to increase the numerical aperture, the curvature or the refractive index of the object lens may be made large. However, if the curvature of the object lens is increased more than ever, there has been a problem that the thickness of the object lens will be so thick that the operation distance i.e. the distance between the object lens and the disk, cannot be secured. Accordingly, it is desired to increase the refractive index of the object lens.

As an optical glass having a large refractive index, which can be used as an object lens having such a large numerical aperture, a $TeO_2$ type glass (hereinafter referred to as conventional glass) comprising 6 mass % of Na, 4 mass % of K, 12 mass % of Ba, 78 mass % of Te, and the rest being O (oxygen) is disclosed (JP-A-2001-180971). Further, the composition of the conventional glass represented by mol % comprises, based on the following oxides, 14.8% of $Na_2O$, 5.8% of $K_2O$, 9.9% of BaO and 69.4% of $TeO_2$.

However, the object lens is required to have not only a large numerical aperture but also a large transmittance and high chemical durability. On the other hand, the above-mentioned conventional glass contains alkali metal oxides in a total amount of 20.6 mol % (=14.8+5.8), whereby it is possible that there will be a problem in chemical durability.

It is an object of the present invention to provide an optical glass and a lens which solve such problems.

SUMMARY OF THE INVENTION

The present invention provides an optical glass which contains at least 20 mol % of $TeO_2$ and has an internal transmittance of at least 80% in a thickness of 2 mm to a light having a wavelength of 405 nm and a refractive index of at least 1.85 to the same light, and which contains no alkali metal oxide or contains alkali metal oxides in a total amount of at most 15 mol %.

Further, the present invention provides the above optical glass which consists essentially of, as represented by mol % based on the following oxides:

| | |
|---|---|
| $TeO_2$ | 20 to 69%, |
| ZnO | 0 to 30%, |
| $Na_2O$ | 0 to 15%, |
| $Y_2O_3$ | 0 to 20%, |
| $GeO_2$ | 0 to 50%, |
| $B_2O_3$ | 0 to 50%, |
| $La_2O_3$ | 0 to 30%, |
| BaO | 0 to 30%, |
| $Ga_2O_3$ | 0 to 20%, |
| $Nb_2O_5$ | 0 to 30%, |
| $P_2O_5$ | 0 to 15%, |
| $Ta_2O_5$ | 0 to 20%, |
| $ZrO_2$ | 0 to 20%, |
| $Hf_2O_3$ | 0 to 20%, |
| $Gd_2O_3$ | 0 to 20%, |
| $In_2O_3$ | 0 to 20%, |
| $Yb_2O_3$ | 0 to 20%, |
| MgO + CaO + SrO | 0 to 20%, |
| $Li_2O + K_2O + Rb_2O + Cs_2O$ | 0 to 10%, |
| $SiO_2 + Al_2O_3$ | 0 to 20%, | wherein the internal transmittance is at least 95%, and $Na_2O+Li_2O+K_2O+Rb_2O+CS_2O$ is from 0 to 15 mol %, and which contains no Fe or contains Fe in such an amount that the content calculated as $Fe_2O_3$ is at most 0.0001% as represented by mass percentage (glass A).

In glass A, in order to have the glass more stabilized, ZnO is preferably from 0.1 to 19 mol %.

Further, the present invention provides the above optical glass which contains no Er or contains Er in such an amount that the content calculated as $Er_2O_3$ is at most 0.01% as represented by mass percentage.

Further, the present invention provides a lens made of the above optical glass.

DETAILED DESCRIPTION OF THE PREFERRED EMBODIMENTS

Hereinafter, the contents of the respective components of glass will be represented by "%", and this is meant for "mol %". Further, for example, "glass X contains 20% of $TeO_2$" means that "glass X contains Te, and the content on the assumption that such Te is present in the form of $TeO_2$, is 20 mol %".

The lens of the present invention is produced, for example, by press-forming the optical glass of the present invention (hereinafter referred to as the glass of the present invention). Namely, the glass of the present invention is processed to form a preform, and then, the preform is heated and softened and press-formed by means of a mold to form a lens. Further, the preform may also be prepared by forming a molten glass.

The lens of the present invention is suitable for use as an object lens in a case where recording on or reading out from an optical recording medium such as CD, CD-R, CD-RW, DVD or MO, is carried out by using a laser having a wavelength of from 400 to 415 nm, e.g. 405 nm.

If the internal transmittance $T_{405}$ of the glass of the present invention in a thickness of 2 mm to a light having a wavelength of 405 nm, is less than 80%, it tends to be difficult to use such glass as the above-mentioned object lens. It is preferably at least 95%, more preferably at least 96%, particularly preferably at least 97%.

The above $T_{405}$ may, for example, be measured as follows. Namely, with respect to two plate-shaped samples having thicknesses of 1 mm and 4 mm and a size of 2 cm×2 cm and having both sides mirror polished, the transmittances to a light having a wavelength of 405 nm are measured by means of a spectral photometer U-3500 (tradename, manufactured by Hitachi, Ltd.). The transmittances of the plate-shaped samples having thicknesses of 1 mm and 4 mm are represented by $T_1$ and $T_4$, respectively, and $T_{405}$ is calculated by the following formula from the transmittance $T_1$ at the thickness of 1 mm and the transmittance $T_4$ at the thickness of 4 mm, obtained by the measurements.

$$T_{405}=100\times\exp[(\tfrac{2}{3})\times\log_e(T_4/T_1)].$$

If the refractive index n of the glass of the present invention to a light having a wavelength of 405 nm, is less than 1.85, the numerical aperture of the object lens tends to be small. It is preferably at least 1.90, more preferably at least 1.95, particularly preferably at least 2.00, most preferably at least 2.05.

The glass transition point $T_G$ of the glass of the present invention is preferably at most 500° C. If it exceeds 500° C., press forming as mentioned above, tends to be difficult. It is more preferably at most 400° C., particularly preferably at most 370° C.

The glass of the present invention is preferably such that in an internal transmittance curve in a thickness of 2 mm to lights having wavelengths of from 300 to 800 nm, the internal transmittance in a thickness of 2 mm is 0% at a wavelength of 300 nm, and when the wavelength is increased beyond 300 nm, the internal transmittance becomes 0.1% for the first time, and the wavelength λe at which the internal transmittance becomes 0.1%, is 345 nm or less.

If λe exceeds 345 nm, coloration tends to be distinct when the glass is irradiated with a laser beam having a wavelength of e.g. 400 nm or 405 nm, and, for example, even when $T_{405}$ was initially 97%, it would be less than 80% after 20 hours, whereby it would be difficult to use it as an object lens. λe is more preferably at most 342 nm, further preferably at most 330 nm, particularly preferably at most 325 nm.

The above internal transmittance may, for example, be measured in the same manner as measuring the internal transmittance at the time of measurement of $T_{405}$, to lights having wavelengths of from 300 to 800 nm.

λe may, for example, be measured as follows. Namely, with respect to the same two plate-shaped samples (those having thicknesses of 1 mm and 4 mm) as used for the above measurement of $T_{405}$, the transmittances to lights having wavelengths of from 300 to 800 nm are measured to obtain an internal transmittance curve for wavelengths of from 300 to 800 nm. The wavelength where the internal transmittance becomes 0.1% at the rising portion of this internal transmittance curve, is taken as λe.

The glass of the present invention is preferably such that when a blue purple light (406.7 nm and 413.1 nm) of Kr+ ion laser is irradiated under a condition of an energy density of 38 kW/m², the reduction ratio L of the transmitted light intensity in a thickness of 2 mm in one hour after the irradiation is at most 16%. If it exceeds 16%, for example, in a case where the glass of the present invention is to be used as an object lens of DVD employing a blue purple laser diode, even if $T_{405}$ was initially 97%, it would decrease to less than 80% after 20 hours, whereby it would be difficult to use it as the above-mentioned object lens. For example, in a case where even if $T_{405}$ is initially 97%, $T_{405}$ after 20 hours is desired to be at least 95%, L is more preferably at most 5%. L is particularly preferably at most 1%.

L may, for example, be measured as follows. Namely, with respect to a plate-shaped sample having a size of 1 cm×1 cm and a thickness of 2 mm and having both sides mirror polished, a blue purple light (wavelength: 406.7 nm and 413.1 nm) of Kr+ ion laser INNOVA300 (tradename), manufactured by COHERENT, Inc. is irradiated for one hour under a condition of 38 kW/m², whereby the transmitted light intensity $I_0$ immediately after the irradiation and the transmitted light intensity $I_1$, after irradiation for one hour, are measured by means of photodiode PD-300UV (tradename), manufactured by Ophir Optonics LTD., whereupon L is calculated by the following formula.

$$L=(I_0-I_1)\times100/I_0$$

If the $TeO_2$ content in the glass of the present invention is less than 20%, the glass tends to be instable, n tends to be small, or $T_G$ tends to be high. In order to make n large, the content is preferably at least 30%.

If the total content of alkali metal oxides in the glass of the present invention exceeds 15%, the chemical durability tends to be low, n tends to be small, the glass tends to be instable, or the hardness tends to be low. The total content is preferably at most 10%, more preferably at most 9%.

The glass of the present invention preferably contains at least one of $GeO_2$, $B_2O_3$ and $P_2O_5$, wherein $GeO_2+B_2O_3+P_2O_5$ is at most 50 mol %. If the glass does not contain any of $GeO_2$, $B_2O_3$ and $P_2O_5$, the above-mentioned λe tends to be large, and L is likely to exceed 16%. The content is preferably at most 30%, particularly preferably at most 15%. If $GeO_2+B_2O_3+P_2O_5$ exceeds 50%, n is likely to be small.

In a case where the glass of the present invention contains at least one of $GeO_2$, $B_2O_3$ and $P_2O_5$, it is preferred that it contains either one of $GeO_2$ and $B_2O_3$, and in a case where the chemical durability and/or the devitrification resistance is desired to be improved, it more preferably contains $GeO_2$, and in a case where the melting temperature is desired to be lowered, it more preferably contains $B_2O_3$. Further, in such cases, $GeO_2+B_2O_3+P_2O_5$ is preferably at least 1%, particularly preferably at least 2%.

The glass of the present invention preferably contains ZnO and/or BaO, wherein ZnO+BaO is at most 40 mol %. If it contains neither ZnO nor BaO, it tends to be difficult to make n large without increasing λe. If ZnO+BaO exceeds 40%, n is likely to be small. It is more preferably at most 25%.

Now, the composition of the above glass A as a preferred embodiment of the glass of the present invention, will be described. $TeO_2$ is a component to form the glass skeleton, and it is also a component to make n large or to lower $T_G$ and is essential. If it is less than 20%, n tends to be small, or TG tends to be high. It is preferably at least 30%, more preferably at least 45%, particularly preferably at least 55%. If it exceeds 69%, $T_{405}$ tends to be small. It preferably is at most 68%.

ZnO is not essential, but may be incorporated up to 30% to stabilize the glass. If it exceeds 30%, it becomes necessary to raise the temperature for melting the glass to a level exceeding 1000° C., whereby it tends to be difficult to melt the glass by means of a metal crucible (melting point: 1063° C.). In a case where the melting temperature is to be made lower, ZnO is preferably at most 19%.

If the above-mentioned temperature for melting the glass exceeds 1000° C., a crucible made of platinum or crucible made of a platinum alloy may, for example, be employed. However, if a glass containing $TeO_2$ at the main component, is melted by using such a crucible, a crucible component such as platinum is likely to be dissolved in the glass, whereby the internal transmittance of the glass or $T_{405}$ is likely to decrease.

In a case where ZnO is incorporated in order to e.g. facilitate vitrification or suppress devitrification at the time of forming, its content is preferably at least 0.1%. It is preferably at least 1%, more preferably at least 3%, particularly preferably at least 5%, most preferably at least 10%.

In the foregoing, a case of employing zinc oxide (melting point: 1975° C.) as the ZnO material to be used for melting glass, is assumed. However, even if a Zno material other than zinc oxide, is employed, if ZnO exceeds 19%, the following problems are likely to result.

For example, if zinc chloride, zinc fluoride, zinc bromide or zinc sulfate is used, chlorine, fluorine, bromine or sulfur is likely to remain, respectively, in the glass, whereby devitrification is likely to result. Further, it is conceivable to use zinc nitrate, but its deliquescence nature is very strong, whereby its handling tends to be difficult.

$Na_2O$ is not essential, but may be incorporated up to 15% in order to stabilize the glass or to lower $T_G$ or the melting temperature. If it exceeds 15%, n is likely to be small. It is preferably at most 11%, more preferably at most 8%. Further, when $Na_2O$ is incorporated, its content is preferably at least 0.1%, more preferably at least 1%, particularly preferably at least 3%.

$Y_2O_3$ is not essential, but may be incorporated up to 20% in order to suppress devitrification at the time of forming. If it exceeds 20%, the glass tends to be rather instable, or $T_G$ is likely to be high. It is preferably at most 10%, more preferably at most 7%, particularly preferably at most 4%. Further, in a case where $Y_2O_3$ is incorporated, its content is preferably at least 0.1%, more preferably at least 1%.

$GeO_2$ is not essential, but may be incorporated up to 50% in order to suppress devitrification at the time of forming. If it exceeds 50%, the glass tends to be instable, or $T_G$ tends to be high. It is preferably at most 30%, more preferably at most 15%, particularly preferably at most 8%. Further, in a case where $GeO_2$ is incorporated, its content is preferably at least 0.1%, more preferably at least 1%, particularly preferably at least 2%.

$B_2O_3$ is not essential, but may be incorporated up to 50% in order to stabilize the glass or to lower $T_G$ or the melting temperature. If it exceeds 50%, n is likely to be small. It is preferably at most 30%, more preferably at most 20%, particularly preferably at most 10%. Further, in a case where $B_2O_3$ is incorporated, its content is preferably at least 0.1%, more preferably at least 1%.

$La_2O_3$ is not essential, but may be incorporated up to 30% in order to suppress devitrification at the time of forming or to increase n or the hardness. If it exceeds 30%, vitrification tends to be difficult. It is more preferably at most 20%, particularly preferably at most 10%, most preferably at most 5%. In a case where $La_2O_3$ is incorporated, its content is preferably at least 0.1%, more preferably at least 1%, particularly preferably at least 3%.

BaO is not essential, but may be incorporated up to 30% in order to suppress devitrification at the time of forming or to increase n up to 30%. If it exceeds 30%, vitrification tends to be difficult. It is more preferably at most 20%, particularly preferably at most 10%. In a case where BaO is incorporated, its content is preferably at least 0.1%, more preferably at least 1%, particularly preferably at least 3%.

$Ga_2O_3$ is not essential, but may be incorporated up to 20% in order to increase the hardness. If it exceeds 20%, the glass is likely to be instable. It is preferably at most 5%.

$Nb_2O_5$ is not essential, but may be incorporated up to 30% in order to increase n or the hardness. If it exceeds 30%, the glass tends to be instable, or the internal transmittance or $T_{405}$ tends to decrease. It is preferably at most 20%, more preferably at most 10%, particularly preferably at most 5%, most preferably at most 3%. In a case where $Nb_2O_5$ is incorporated, its content is preferably at least 0.1%, more preferably at least 1%. Further, in a case where it is desired to increase the internal transmittance or $T_{405}$, it is preferred not to incorporate $Nb_2O_5$.

$P_2O_5$ is not essential, but may be incorporated up to 15% in order to stabilize the glass. If it exceeds 15%, chemical durability, particularly water resistance, tends to be low, or n is likely to be small. It is preferably at most 10%, particularly preferably at most 5%, most preferably at most 3%. In a case where $P_2O_5$ is incorporated, its content is preferably at least 0.1%, more preferably at least 1%, particularly preferably at least 3%. Here, in a case where it is desired to further increase water resistance, it is preferred not to incorporate $P_2O_5$.

Each of $Ta_2O_5$, $ZrO_2$, $Hf_2O_3$, $Gd_2O_3$, $In_2O_3$ and $Yb_2O_3$ is not essential, but may be incorporated within a range of up to 20% each in order to increase n or the hardness without reducing the internal transmittance or $T_{405}$. If each exceeds 20%, the glass is likely to be instable. Each of them is preferably at most 10%, more preferably at most 5%. For example, in a case where it is desired to increase $T_{405}$, $In_2O_3$ is preferably at most 10%, more preferably at most 5%, particularly preferably at most 2%. In a case where any of these six components is contained, the content is preferably at least 0.1%, more preferably at least 1%. Further, the total content of $Ta_2O_5$, $ZrO_2$, $Hf_2O_3$, $Gd_2O_3$, $In_2O_3$ and $Yb_2O_3$ is preferably at most 25%.

Each of MgO, CaO and SrO is not essential, but may be incorporated within a range of up to 20% in total in order to stabilize the glass or to adjust n. If the total exceeds 20%, the glass tends to be rather instable, or n tends to be small. It is preferably at most 10%, more preferably at most 5%.

Each of $Li_2O$, $K_2O$, $Rb_2O$ and $Cs_2O$ is not essential, but may be incorporated within a range of up to 10% in total in order to lower the melting temperature. If the total exceeds 10%, the glass tends to be instable, n or the hardness tends to be small, or the chemical durability tends to deteriorate. The total is preferably at most 5%. In a case where it is desired to increase the hardness or in a case where it is desired to improve the chemical durability, it is preferred not to incorporate any one of them.

The total content of $Na_2O$, $Li_2O$, $K_2O$, $Rb_2O$ and $Cs_2O$ must be at most 15%. If it exceeds 15%, the chemical durability tends to decrease. The total amount is more preferably at most 12%, more preferably at most 9%.

Each of $SiO_2$ and $Al_2O_3$ is not essential, but may be incorporated up to 20% in total in order to improve the water resistance. If the total exceeds 20%, $T_G$ or the melting temperature tends to be high, or n is likely to be small. The total is preferably at most 10%, more preferably at most 5%.

Glass A consists essentially of the above-mentioned components, but it may contain other components within a range not to impair the purpose of the present invention.

For example, in order to increase n or the hardness, $MoO_3$, $RuO_2$, $Nd_2O_3$, $Pr_2O_3$, $CeO_2$, $Sm_2O_3$, $Eu_2O_3$, $Tb_2O_3 Ho_2O_3$ or $Tm_2O_3$ may be incorporated within such a range that the total content thereof is at most 10%. If the total content exceeds 10%, $T_{405}$ tends to decrease. The total content is preferably at most 5%, more preferably at most 1%. Further, to improve the clarity, $SO_3$, $As_2O_5$ or $Sb_2O_5$ may be incorporated within such a range that the total content thereof is at most 2%.

Glass A contains no Fe, or even if it contains Fe, the content calculated as $Fe_2O_3$ is at most 0.0001% as represented by mass percentage. If it exceeds 0.0001%, $T_{405}$ tends to decrease.

As a preferred embodiment of glass A, one comprising from 55 to 68% of $TeO_2$, from 10 to 19% of ZnO, from 3 to 15% of $Na_2O$, from 1 to 4% of $Y_2O_3$ and from 2 to 8% of $GeO_2$, may be exemplified.

For example, in a case where it is desired to bring λe to e.g. at most 342 nm, it is preferred that in glass A, $TeO_2$ is from 30 to 67%, ZnO+BaO is from 0 to 40%, $Na_2O$ is from 0 to 10%, $GeO_2+B_2O_3+P_2O_5$ is from 0 to 50%, $Y_2O_3+La_2O_3+Ta_2O_5+ZrO_2+Gd_2O_3+Yb_2O_3$ is from 0 to 30%.

For example, in a case where it is desired to bring L to be e.g. at most 16%, it is preferred that in glass A, $TeO_2$ is from 30 to 65%, ZnO+BaO is from 0 to 40%, $Na_2O$ is from 0 to 10%, $GeO_2+B_2O_3+P_2O_5$ is from 0.1 to 50%, and $Y_2O_3+La_2O_3+Ta_2O_5+ZrO_2+Gd_2O_3+Yb_2O_3$ is from 0 to 30%.

For example, in a case where it is desired to bring L to e.g. at most 5%, it is preferred that in glass A, $TeO_2$ is from 30 to 60%, ZnO+BaO is from 0 to 40%, $Na_2O$ is from 0 to 8%, $GeO_2+B_2O_3+P_2O_5$ is from 0.1 to 50%, and $Y_2O_3+La_2O_3+Ta_2O_5+ZrO_2+Gd_2O_3+Yb_2O_3$ is from 0 to 30%, and $Li_2O+K_2O+Rb_2O+Cs_2O$ is from 0 to 8%.

The glass of the present invention preferably contains no Er or even if Er is contained, its content calculated as $Er_2O_3$ is less than 0.01% as represented by mass percentage. If it exceeds 0.01%, $T_{405}$ is likely to be small. It is more preferably at most 0.001%, particularly preferably at most 0.0001%.

The glass of the present invention preferably contains none of $TiO_2$, $Bi_2O_3$ and $WO_3$. If these components are contained, $T_{405}$ is likely to be small.

Further, the glass of the present invention preferably contains none of PbO and $Tl_2O$.

For the production of the glass of the present invention, tellurium dioxide, zinc oxide, lanthanum oxide, yttrium oxide, germanium oxide, boron oxide, gallium oxide, sodium carbonate, barium carbonate, etc., are used as starting materials, and the purities of these materials must be ones whereby the purpose of the present invention can be accomplished.

For example, tellurium dioxide is used as the material for $TeO_2$, its purity is preferably at least 99.99%. If the purity is less than 99.99%, the Fe content is likely to be large. It is more preferably at least 99.999%. Further, the same applies also in a case where zinc oxide is used as the material for ZnO.

EXAMPLES

Materials were mixed to have the composition shown by mol % in the lines for $TeO_2$ to $Ga_2O_3$ in Table 1, put into a crucible made of gold and melted for one hour at from 800 to 1000° C. At that time, the molten glass was homogenized by stirring for 0.5 hour by means of a stirrer made of gold. The homogenized molten glass was cast and formed into a plate shape, followed by annealing.

As the materials, in Examples 1 to 8, tellurium dioxide having a purity of at least 99.999% manufactured by Shinko Chemical Co., Ltd., zinc oxide having a purity of at least 99.999% manufactured by Kojundo Chemical Laboratory Co., Ltd., lanthanum oxide, yttrium oxide, germanium oxide, boron oxide and gallium oxide having a purity of at least 99.9%, manufactured by the same company, or super-high grades of sodium carbonate and barium carbonate, manufactured by Kanto Kagaku, were used. In Example 9, materials were selected for use from those listed above, except that tellurium dioxide having a purity of at least 99.9% manufactured by Kojundo Chemical Laboratory Co., Ltd. was used instead of the above-mentioned tellurium dioxide manufactured by Shinko Chemical Co., Ltd.

With respect to the obtained glass, the content of Fe calculated as $Fe_2O_3$ as represented by mass percentage (unit: $1\times10^{-4}$%), the glass transition point $T_G$ (unit: °C.), the refractive index n' to light having a wavelength of 633 nm, a refractive index n to light having a wavelength of 405 nm, the internal transmittance $T_{405}$ (unit: %) in a thickness of 2 mm, λe (unit: nm) and L (unit: %) were measured.

Here, n was measured only with respect to Examples 8 and 9, and n in Examples 1 to 7 is values (=n'+0.10) results of measurement of n and n' in Examples 8 and 9.

λe was measured only with respect to Examples 3 to 6 and 8, and λe in Examples 1, 2, 7 and 9 is values assessed from the compositions.

L in Examples 1 to 9 is all assessed values. With respect to ones where the measured values of λe were available, L was assessed from the interrelation between L and λe, and with respect to ones where no measured values of λe were available, λe was assessed from the compositions, and the respective L was assessed from the assessed value of λe.

Further, the content calculated as $Fe_2O_3$ in Example 9 being larger than in Examples 1 to 8, is considered to be attributable to the fact that tellurium dioxide having a low purity was used as the Te material. Further, the content of Fe calculated as $Fe_2O_3$ represented by mol % in Example 9 was 0.00021%.

Methods for measuring n', n and $T_G$ will be described as follows.

n': A plate-shaped sample having a size of 2 cm×2 cm and a thickness of 1 mm and having both sides mirror-polished, was measured by means of a refractive index measuring apparatus Model 2010 PRISMCOUPLER (tradename) manufactured by Metricon Corporation.

n: The glass was processed into a triangular shaped prism having one side of 30 mm and a thickness of 10 mm, which was measured by a precision spectrometer GMR-1 (tradename) manufactured by Kalnew Optical Company.

$T_G$: A sample processed into a columnar shape having a diameter of 5 mm and a length of 20 mm, was measured at a temperature raising rate of 5° C./min by means of thermal mechanical analyzer TMA8140 (tradename) manufactured by Rigaku Corporation.

TABLE 1

|  | 1 | 2 | 3 | 4 | 5 | 6 | 7 | 8 | 9 |
|---|---|---|---|---|---|---|---|---|---|
| $TeO_2$ | 69 | 67 | 65 | 65 | 63 | 63 | 63 | 63 | 69 |
| ZnO | 18 | 19 | 19 | 17 | 16.5 | 16.5 | 16.5 | 16.5 | 18 |
| $Na_2O$ | 5 | 5 | 5 | 5 | 4.9 | 4.9 | 4.9 | 4.9 | 5 |
| $Y_2O_3$ | 3 | 3 | 3 | 3 | 2.9 | 2.9 | 2.9 | 2.9 | 3 |
| $GeO_2$ | 5 | 5 | 5 | 5 | 4.9 | 4.9 | 4.9 | 4.9 | 5 |
| $B_2O_3$ | 0 | 1 | 3 | 5 | 4.8 | 4.8 | 4.8 | 7.8 | 0 |

TABLE 1-continued

|  | 1 | 2 | 3 | 4 | 5 | 6 | 7 | 8 | 9 |
|---|---|---|---|---|---|---|---|---|---|
| $La_2O_3$ | 0 | 0 | 0 | 0 | 0 | 3 | 0 | 0 | 0 |
| BaO | 0 | 0 | 0 | 0 | 0 | 0 | 0 | 0 | 0 |
| $Ga_2O_3$ | 0 | 0 | 0 | 0 | 0 | 0 | 3 | 0 | 0 |
| $Fe_2O_3$ | <1 | <1 | <1 | <1 | <1 | <1 | <1 | <1 | 1.7 |
| $T_G$ | 340 | 340 | 340 | 340 | 340 | 360 | 350 | 340 | 340 |
| n' | 2.01 | 2.00 | 1.98 | 1.97 | 1.96 | 1.96 | 1.95 | 1.96 | 2.01 |
| n | 2.11 | 2.11 | 2.08 | 2.07 | 2.06 | 2.06 | 2.05 | 2.06 | 2.11 |
| $T_{405}$ | 95 | 96 | 97 | 97 | 97 | 98 | 98 | 99 | 85 |
| λe | 350 | 350 | 346 | 347 | 346 | 343 | 345 | 345 | 352 |
| L | 20 | 20 | 15 | 15 | 15 | 14 | 15 | 15 | 25 |

Glasses of Examples 10 to 16 having compositions represented by mol percentage in the lines for $TeO_2$ to $B_2O_3$ in Table 2, were prepared in the same manner as glasses of Examples 1 to 8. However, the melting time was from 0.5 to 3 hours, and the stirring time by the stirrer was from 0.5 to 1 hour. The contents calculated as $Fe_2O_3$ in glasses of Examples 10 to 16 were not measured, but the same contents are considered to be less than $1\times10^{-4}\%$, since the same ones as in glasses of Examples 1 to 8 were used as the materials.

In Examples 10 to 16, n', λe and L were measured, but n and $T_{405}$ were assessed from the compositions, and the assessed values are shown in Table 2. Further, $T_G$ was measured with respect to Examples 11 to 16, but $T_G$ in Example 10 is a value assessed from the composition.

Here, assessment of n from n' was carried out as follows taking into consideration the dispersion characteristic of the wavelength. Namely, in a case where n'≧1.95, n=n'+0.10 (Examples 10 to 13, the after-mentioned Examples 18, 20 to 22, 25 to 31 and 40), in a case where 90≦n'<1.95, n=n'+0.09 (Examples 14 and 15), in a case where 1.85≦n'<1.90, n=n'+0.07, in a case where 1.80≦n'<1.85, n=n'+0.06 (Example 16, and the after-mentioned Example 23), and in a case where 1.75≦n'<1.80, n=n'+0.05 (the after-mentioned Example 24).

TABLE 2

|  | 10 | 11 | 12 | 13 | 14 | 15 | 16 |
|---|---|---|---|---|---|---|---|
| $TeO_2$ | 70 | 67 | 64 | 60 | 57 | 54 | 40 |
| ZnO | 17 | 20 | 23 | 27 | 27 | 30 | 30 |
| $Na_2O$ | 5 | 5 | 5 | 5 | 8 | 8 | 0 |

TABLE 2-continued

|  | 10 | 11 | 12 | 13 | 14 | 15 | 16 |
|---|---|---|---|---|---|---|---|
| $Y_2O_3$ | 3 | 3 | 3 | 3 | 3 | 3 | 0 |
| $GeO_2$ | 5 | 5 | 5 | 5 | 5 | 5 | 0 |
| $B_2O_3$ | 0 | 0 | 0 | 0 | 0 | 0 | 30 |
| $T_G$ | 330 | 340 | 345 | 345 | 335 | 335 | 405 |
| n' | 2.01 | 2.00 | 1.99 | 1.97 | 1.93 | 1.92 | 1.83 |
| n | 2.11 | 2.10 | 2.09 | 2.07 | 2.02 | 2.01 | 1.89 |
| $T_{405}$ | 95 | 96 | 97 | 97 | 97 | 98 | 98 |
| λe | 345 | 342 | 339 | 335 | 330 | 327 | 324 |
| L | 18.1 | 18.9 | 16.3 | 12.2 | 5.99 | 4.91 | 0.16 |

Glasses of Examples 17 to 40 having compositions represented by mol% in the lines for $TeO_2$ to $Al_2O_3$ in Tables 3 to 5, were prepared in the same manner as the glasses of Examples 1 to 8. However, the melting time was from 1.5 to 3 hours, and the stirring time by the stirrer was from 0.5 to 1 hour. Example 24 is a Comparative Example.

The contents calculated as $Fe_2O_3$ in the obtained glasses of Examples 17 to 40 were not measured, but the same contents are considered to be less than $1\times10^{-4}\%$, respectively, since the same ones as for the glasses of Examples 1 to 8 were used as materials.

$T_G$ in Examples 18 and 29 to 38, and $T_{405}$ in Examples 19 to 38 and 40 are values assessed from the compositions, respectively.

Further, n' in Examples 21 to 23, 28 to 31 and 40, n in Examples 18, 20 to 31 and 40, λe in Examples 19 to 38 and 40 and L in Examples 18 to 38 and 40, are assessed values, respectively.

TABLE 3

|  | 17 | 18 | 19 | 20 | 21 | 22 | 23 | 24 |
|---|---|---|---|---|---|---|---|---|
| $TeO_2$ | 65 | 65 | 65 | 65 | 65 | 65 | 30 | 20 |
| ZnO | 17 | 15 | 17.5 | 15 | 12.5 | 17.5 | 40 | 50 |
| $Na_2O$ | 5 | 5 | 5 | 5 | 5 | 5 | 0 | 0 |
| $Y_2O_3$ | 3 | 2.5 | 2.5 | 2.5 | 2.5 | 2.5 | 0 | 0 |
| $GeO_2$ | 5 | 5 | 5 | 5 | 5 | 5 | 0 | 0 |
| $B_2O_3$ | 0 | 0 | 0 | 0 | 0 | 0 | 30 | 30 |
| $La_2O_3$ | 5 | 7.5 | 0 | 0 | 0 | 0 | 0 | 0 |
| BaO | 0 | 0 | 5 | 7.5 | 10 | 0 | 0 | 0 |
| $In_2O_3$ | 0 | 0 | 0 | 0 | 0 | 5 | 0 | 0 |
| $Al_2O_3$ | 0 | 0 | 0 | 0 | 0 | 0 | 0 | 0 |
| $T_G$ | 370 | 390 | 335 | 335 | 335 | 370 | 440 | 460 |
| n' | 1.98 | 1.97 | 1.98 | 1.98 | 1.98 | 1.98 | 1.80 | 1.77 |
| n | 2.07 | 2.07 | 2.08 | 2.08 | 2.08 | 2.08 | 1.86 | 1.82 |
| $T_{405}$ | 97 | 97 | 97 | 97 | 97 | 94 | 99 | 99 |
| λe | 342 | 342 | 345 | 345 | 345 | 350 | 315 | 305 |
| L | 16 | 16 | 16 | 16 | 16 | 20 | 0 | 0 |

TABLE 4

|  | 25 | 26 | 27 | 28 | 29 | 30 | 31 | 32 |
|---|---|---|---|---|---|---|---|---|
| $TeO_2$ | 65 | 65 | 65 | 65 | 68.42 | 68.42 | 68.42 | 63.05 |
| ZnO | 17 | 17 | 17 | 17 | 17.9 | 17.9 | 12.9 | 16.5 |
| $Na_2O$ | 5.5 | 6 | 6.5 | 7 | 0 | 5.26 | 0 | 4.85 |
| $Y_2O_3$ | 2.5 | 2 | 1.5 | 1 | 3.16 | 3.16 | 3.16 | 2.9 |
| $GeO_2$ | 5 | 5 | 5 | 5 | 5.26 | 0 | 5.26 | 4.85 |
| $B_2O_3$ | 0 | 0 | 0 | 0 | 0 | 0 | 5 | 4.85 |
| $La_2O_3$ | 5 | 5 | 5 | 5 | 5.26 | 5.26 | 5.26 | 0 |
| BaO | 0 | 0 | 0 | 0 | 0 | 0 | 0 | 0 |
| $In_2O_3$ | 0 | 0 | 0 | 0 | 0 | 0 | 0 | 3 |
| $Al_2O_3$ | 0 | 0 | 0 | 0 | 0 | 0 | 0 | 0 |
| $T_G$ | 360 | 350 | 355 | 340 | 370 | 350 | 380 | 385 |
| n' | 1.97 | 1.98 | 1.97 | 1.97 | 2.01 | 2.00 | 1.97 | 1.96 |
| n | 2.07 | 2.08 | 2.07 | 2.07 | 2.11 | 2.10 | 2.07 | 2.05 |
| $T_{405}$ | 97 | 97 | 97 | 97 | 95 | 95 | 95 | 95 |
| λe | 345 | 345 | 345 | 345 | 350 | 350 | 350 | 350 |
| L | 16 | 16 | 16 | 16 | 20 | 20 | 20 | 20 |

TABLE 5

|  | 33 | 34 | 35 | 36 | 37 | 38 | 39 | 40 |
|---|---|---|---|---|---|---|---|---|
| $TeO_2$ | 63.05 | 63.05 | 63.05 | 63.05 | 63.05 | 63.05 | 70 | 70 |
| ZnO | 16.5 | 16.5 | 16.5 | 16.5 | 16.5 | 16.5 | 0 | 0 |
| $Na_2O$ | 4.85 | 4.85 | 7.85 | 4.85 | 4.85 | 4.85 | 5.38 | 5.38 |
| $Y_2O_3$ | 5.9 | 2.9 | 2.9 | 2.9 | 2.9 | 2.9 | 3.23 | 3.23 |
| $GeO_2$ | 4.85 | 7.85 | 4.85 | 4.85 | 4.85 | 4.85 | 5.38 | 5.38 |
| $B_2O_3$ | 4.85 | 4.85 | 4.85 | 4.85 | 4.85 | 4.85 | 16 | 10 |
| $La_2O_3$ | 0 | 0 | 0 | 0 | 0 | 0 | 0 | 0 |
| BaO | 0 | 0 | 0 | 0 | 0 | 0 | 0 | 0 |
| $Nb_2O_3$ | 0 | 0 | 0 | 3 | 0 | 0 | 0 | 0 |
| $ZrO_2$ | 0 | 0 | 0 | 0 | 3 | 0 | 0 | 0 |
| $Al_2O_3$ | 0 | 0 | 0 | 0 | 0 | 3 | 0 | 6 |
| $T_G$ | 390 | 385 | 340 | 390 | 390 | 390 | 415 | 425 |
| n' | 1.95 | 1.96 | 1.96 | 1.99 | 1.96 | 1.94 | 1.97 | 1.97 |
| n | 2.04 | 2.06 | 2.06 | 2.09 | 2.06 | 2.03 | 2.06 | 2.07 |
| $T_{405}$ | 99 | 99 | 99 | 94 | 99 | 99 | 94 | 93 |
| λe | 340 | 340 | 340 | 350 | 340 | 340 | 350 | 350 |
| L | 12 | 12 | 12 | 20 | 12 | 12 | 14.8 | 20 |

According to the present invention, it is possible to obtain an optical glass which has a small content of alkali metal oxides and which has a large refractive index and a large internal transmittance to light having a wavelength of 405 nm. Further, it is possible to obtain an optical glass which has no or little reduction in the transmitted light intensity by a blue purple light irradiation. By using the glass of the present invention, it is possible to obtain a lens such as an object lens suitable for recording on or reading out from an optical recording medium such as CD, CD-R, CD-RW, DVD or MO, by press forming.

The entire disclosures of Japanese Patent Application No. 2002-147849 filed on May 22, 2002 and Japanese Patent Application No. 2003-143617 filed on May 21, 2003 including specifications, claims and summaries are incorporated herein by reference in their entireties.

What is claimed is:

1. An optical glass which contains at least 20 mol % of $TeO_2$ and has an internal transmittance of at least 95% in a thickness of 2 mm to a light having a wavelength of 405 nm and a refractive index of at least 2.00 to the same light, which contains no alkali metal oxide or contains alkali metal oxides in a total amount of at most 15 mol %, and which contains no Er or contains Er in such an amount that the content calculated as $Er_2O_3$ is at most 0.01% as represented by mass percentage.

2. The optical glass according to claim 1, which contains at least one of $GeO_2$, $B_2O_3$ and $P_2O_5$, wherein $GeO_2+B_2O_3+P_2O_5$ is at most 50 mol %.

3. The optical glass according to claim 1, which contains ZnO and/or BaO, wherein ZnO+BaO is at most 40 mol %.

4. The optical glass according to claim 1, which consists essentially of, as represented by mol % based on the following oxides:

| | |
|---|---|
| $TeO_2$ | 20 to 69%, |
| ZnO | 0 to 30%, |
| $Na_2O$ | 0 to 15%, |
| $Y_2O_3$ | 0 to 20%, |
| $GeO_2$ | 0 to 50%, |
| $B_2O_3$ | 0 to 50%, |
| $La_2O_3$ | 0 to 30%, |
| BaO | 0 to 30%, |
| $Ga_2O_3$ | 0 to 20%, |
| $Nb_2O_5$ | 0 to 30%, |
| $P_2O_5$ | 0 to 15%, |
| $Ta_2O_5$ | 0 to 20%, |
| $ZrO_2$ | 0 to 20%, |
| $Hf_2O_3$ | 0 to 20%, |
| $Gd_2O_3$ | 0 to 20%, |
| $In_2O_3$ | 0 to 20%, |
| $Yb_2O_3$ | 0 to 20%, |
| MgO + CaO + SrO | 0 to 20%, |
| $Li_2O + K_2O + Rb_2O + Cs_2O$ | 0 to 10%, |
| $SiO_2+ Al_2O_3$ | 0 to 20%, | wherein the internal transmittance is at least 95%, and $Na_2O+Li_2O+K_2O+Rb_2O+CS_2O$ is from 0 to 15 mol %, and which contains no Fe or contains Fe in such an amount that the content calculated as $Fe_2O_3$ is at most 0.0001% as represented by mass percentage.

5. The optical glass according to claim 4, wherein $TeO_2$ is from 55 to 68%, ZnO is from 10 to 19%, $Na_2O$ is from 3 to 15%, $Y_2O_3$ is from 1 to 4%, and $GeO_2$ is from 2 to 8%.

6. The optical glass according to claim 4, wherein $TeO_2$ is from 30 to 67%, ZnO+BaO is from 0 to 40%, $Na_2O$ is from 0 to 10%, $GeO_2+B_2O_3+P_2O_5$ is from 0 to 50%, and $Y_2O_3+La_2O_3+Ta_2O_5+ZrO_2+Gd_2O_3+Yb_2O_3$ is from 0 to 30%.

7. The optical glass according to claim 1, wherein, in an internal transmittance curve in a thickness of 2 mm to lights having wavelengths of from 300 to 800 nm, the internal transmittance in a thickness of 2 mm is 0% at a wavelength of 300 nm, and when the wavelength is increased beyond 300 nm, the internal transmittance becomes 0.1% for the first time, and the wavelength at which the internal transmittance becomes 0.1%, is 345 nm or less.

8. The optical glass according to claim 1, wherein when a blue purple light (406.7 nm and 413.1 nm) of $Kr^+$ ion laser is irradiated under a condition of an energy density of 38 $kW/m_2$, the reduction ratio L in one hour after the irradiation of the transmitted light intensity in a thickness of 2 mm is at most 16%.

9. The optical glass according to claim 8, wherein the reduction ratio L is at most 5%.

10. A lens made of the optical glass as defined in claim 1.

* * * * *